April 28, 1936.　　　L. S. BUSKIRK　　　2,038,641
SPRING LIFTING DEVICE
Filed Nov. 19, 1932
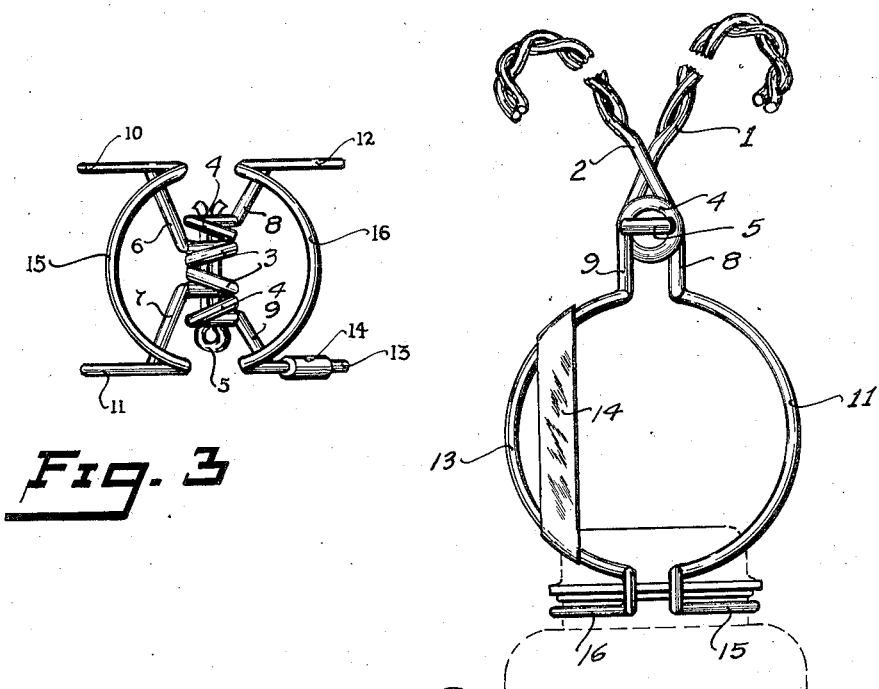
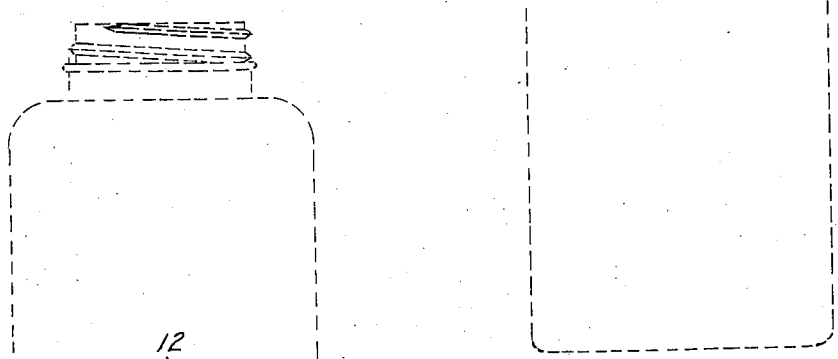
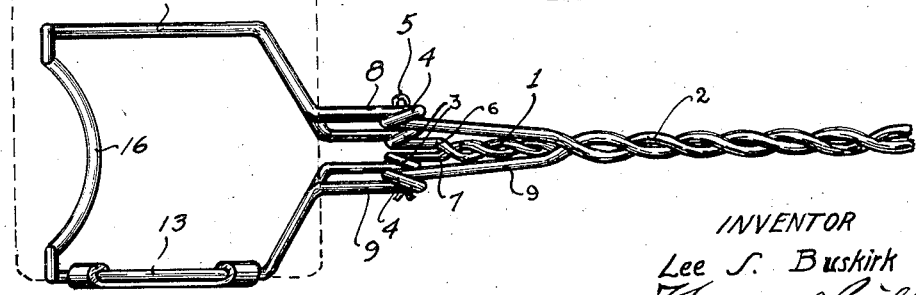

Patented Apr. 28, 1936

2,038,641

UNITED STATES PATENT OFFICE 2,038,641

SPRING LIFTING DEVICE

Lee S. Buskirk, Portland, Oreg.

Application November 19, 1932, Serial No. 643,442

1 Claim. (Cl. 294—28)

My invention relates to lifting devices. It has for its primary purpose and object the provision of a clamping device adapted to engage fruit jars and like objects to facilitate their manipulation while in a heated condition as when being removed from a cooker or oven, without the use of fabric holders or other devices.

The device is primarily made of non-corrodible spring wire, and consists of a pair of members hinged together about a common hinge pin and having a clamping head with a supporting shelf secured thereto adapted to engage a fruit jar top or side to permit lifting the same from the heat applicator where it is being sterilized, or in which the contents are being processed. Handles having turned ends terminate the device to aid in retaining it in the hand of the user and to minimize the possibility of dropping the lifter and its load.

The invention is comprised of two like, or similar members each having a clamping head, adapted for engaging cylindrical or substantially cylindrical objects, and a handle portion. The two members are hinged together about a common hinge pin. Each primary member is comprised of a single piece of spring material preferably made of non-corrodible material.

The object of my device is to provide a simply constructed clamping lifter that may be used in lifting hot fruit jars in the home canning of foods.

A still further object of my invention consists in providing a clamping lifter which may be used in handling articles and materials that are too hot or too cold to be conveniently and comfortably held in the hands of the user.

With these and incidental objects in view, the invention consists in certain novel features of construction and combination of parts, the essential elements of which are set forth in the appended claim, and a preferred form of embodiment of which is hereinafter shown with reference to the drawing which accompanies and forms a part of this specification.

In the drawing:

Fig. 1 is a side view of one of my devices illustrated in use upon a fruit jar and showing the supporting shelf in place beneath the jar. In this view the fruit jar is shown in dotted outline.

Fig. 2 is a fragmentary, side view of the device shown applied to the neck of the jar to be lifted.

Fig. 3 is an end view of the device illustrated in Fig. 1 and Fig. 2.

Like reference characters refer to like parts throughout the several views.

My device comprises a pair of handle members 1 and 2, each handle member being formed of a single piece of non-corrodible wire doubled upon itself, the two ends being twisted about each other for a substantial distance from their terminus. The handle member 1 has a loop 3 formed in each of its legs 6 and 7 and the handle member 2 has a loop 4 formed in each of its legs 8 and 9. These loops are adjacent the twisted portion and are disposed on a common longitudinal center line to receive a journaling cotter pin 5.

The legs 6 and 7 of the handle member 1 diverge from the loops 3 to form arcuate clamping jaws 10 and 11 respectively. The legs 8 and 9 of the handle member 2 diverge from the loops 4 to form arcuate clamping jaws 12 and 13 respectively. The arc of each of the clamping jaws is substantially semi-circular and their longitudinal center line is parallel to the longitudinal center line of the loops 3 and 4.

A supporting shelf 14 is chordally disposed across the arcuate clamping jaw 13 and is secured thereto in any suitable manner.

The clamping jaws 10 and 11 of the handle member 1 are secured together at their outer ends by an arcuate clamping jaw 15. The clamping jaws 12 and 13 are secured together at their outer ends by an arcuate clamping jaw 16. The clamping jaws 15 and 16 are formed in the unit piece of wire from which the handles 1 and 2 respectively are formed. The arc of each clamping jaw 15 and 16 is substantially semi-circular and its longitudinal axis is perpendicular to the longitudinal axis of the clamping jaws 10 to 13 inclusive.

It will be seen that the clamping jaws 10 to 13 inclusive are adapted to fit about the side of the jar to be lifted and that the jaws 15 and 16 are adapted to fit about the neck of the jar.

When it is desired to lift a jar with the clamping jaws 10 to 13 inclusive, the jaws are placed about the jar adjacent its base. When pressure is applied to the handle members 1 and 2, the supporting shelf 14 will slide beneath the jar and prevent it from sliding through the clamping jaws when the jar is lifted.

The utility of this structure will be readily appreciated where jaws are removed from ovens or any other receptacle where there is not sufficient head room to apply the device to the neck of the jar.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claim which follows.

What I claim is:

In a device of the class described, the combination of a pair of clamping jaws formed integral with a pair of pivotally connected handles, said clamping jaws being arranged at right angles to the longitudinal center line of the handles, and the outermost ends of said clamping jaws being of arcuate shape to form supplemental clamping jaws for gripping an object disposed at right angles to an object engageable by the first mentioned clamping jaws and having a supporting plate secured across the arch of one of the clamping jaws that are arranged at right angles to the longitudinal center line of the handles.

LEE S. BUSKIRK.